United States Patent [19]
West

[11] Patent Number: 5,053,635
[45] Date of Patent: Oct. 1, 1991

[54] UNINTERRUPTIBLE POWER SUPPLY WITH A VARIABLE SPEED DRIVE DRIVING A SYNCHRONOUS MOTOR/GENERATOR

[75] Inventor: Geoffrey West, Irvine, Calif.

[73] Assignee: Atlas Energy Systems, Inc., San Diego, Calif.

[21] Appl. No.: 344,682

[22] Filed: Apr. 28, 1989

[51] Int. Cl.$^5$ .............................................. H02J 9/06
[52] U.S. Cl. ....................... 307/67; 307/46; 307/47; 307/66; 307/68; 322/29; 322/47
[58] Field of Search ............................ 307/9.1, 18–21, 307/23, 25, 29, 43–48, 64–68, 85–87, 120; 322/10–13, 20, 38, 39, 47, 29, 32; 318/138, 139, 700, 720, 722, 723, 438, 441; 361/20

[56] References Cited

U.S. PATENT DOCUMENTS

| | | | |
|---|---|---|---|
| 4,460,834 | 7/1984 | Gottfried | 307/64 |
| 4,488,198 | 12/1984 | Christen et al. | 361/20 |
| 4,517,471 | 5/1985 | Sachs | 307/67 |
| 4,734,626 | 3/1988 | Sutrina et al. | 318/76 |

OTHER PUBLICATIONS

Power Systems & Controls, Inc., "Uninterruptible Power Systems for Computers", Series 760L, Oct. 1988.
"Theory of Operation Synchronous Brushless Motor", Kato Engineering, Jul., 1977.
Yaskawa Electric Mfg. Co., Ltd., Transistor Invertor, Varispeed–616HII Instruction Manual, No date.
IEEE Transactions on Industry Applications, vol. IA-23 No. 5, Sep./Oct. 1987, "A Low-Impedance Uninterruptible Power Technology for Nonlinear Critical Loads" by Klaus Sachs, R. W. Larson, D. P. Decoster, and Stanley Plato.

Primary Examiner—A. D. Pellinen
Assistant Examiner—David Osborn
Attorney, Agent, or Firm—Baker, Maxham, Jester & Meador

[57] ABSTRACT

An uninterruptible power source is disclosed and claimed which includes a synchronous motor/generator assembly and a continuously on line variable speed drive connected to inductively accelerate the motor/generator assembly to near synchronous speed. When the motor/generator assembly reaches near synchronous speed, the motor/generator is switched to synchronous operation, while still under control of the variable speed drive. The variable speed drive is connected to maintain synchronicity with the motor/generator during acceleration. Resultantly, when switchover to synchronous operation occurs, no synchronization of the motor/generator to the variable speed drive is required. The variable speed drive operates in response to a utility power signal and to a standby power signal. When the utility power signal fails, operation of the drive is maintained, without interruption, by the standby power.

13 Claims, 3 Drawing Sheets

UNINTERRUPTIBLE POWER SUPPLY WITH A VARIABLE SPEED DRIVE DRIVING A SYNCHRONOUS MOTOR/GENERATOR

BACKGROUND OF THE INVENTION

This invention is in the field of uninterruptible power supply systems in which a motor/generator pair is operated to provide a multi-phase output power signal in response to a power signal derived from a main power source, or from a standby DC source when the MAINS are interrupted.

In the uninterruptible power source (UPS) art, it is known to provide a synchronous motor which is coupled to a synchronous generator and to drive the motor by a power arrangement which derives energy from a multi-phase utility power signal. When the utility (MAINS) power signal is interrupted, a standby battery circuit connected to the motor driving arrangement provides the energy to drive the motor. The changeover from the MAINS to the standby source must be fast enough to result in no interruption of motor/generator operation, thereby ensuring that the multi-phase load power signal derived from the generator is "uninterruptible" and within the requirements of the critical load.

In the prior art, arrangements for driving the synchronous motor/generator pair include UPS systems which employ "offline" inverters. When the MAINS power drops, the offline inverter is switched on to convert the DC power of a standby battery circuit to a multi-phase power signal which drives the motor. The offline inverter characteristically employs high-power semiconductor switches, such as SCRs, for power conversion. When switchover occurs from MAINS to standby power, the SCRs must be switched on. When switchover occurs, it is not uncommon for a cold SCR to fail catastrophically when suddenly energized with a high-magnitude power surge.

Further, an UPS system utilizing an offline inverter must also employ an induction motor. At switchover, the rotation of a synchronous motor would not be in phase with the operation of the switched-on inverter without synchronization. Such synchronization is typically a synchronizing circuit which requires a significant amount of time to synchronize the inverter and the motor, during which time the output power signal could drop. At switchover, however, rotation of an induction motor does not need to be synchronized with the operation of the inverter. As is known, an induction motor exhibits "slippage", which is the difference between the speed of the induction motor, and the ideal motor speed required to give the correct voltage/frequency characteristic to the multi-phase power signal output by the generator. Since an induction motor characteristically rotates with a speed somewhat lower than that required for ideal generator operation, an UPS system employing an induction motor will give marginal operation due to the motor's slippage.

One prior UPS design employs a motor/generator pair in which both elements are synchronous, and which uses an inverter to provide a motor drive signal. The inverter is "quasi"-online, in that it is continuously provided a signal which keeps its power switching elements "on" throughout the operation of the UPS. However, while the MAINS source is operating as required, it alone drives the synchronous motor. Thus, at switchover, the operation of the inverter must be synchronized with the rotation of the synchronous motor. This requires the employment of synchronizing circuitry during switchover, which can result in degradation or interruption of multi-phase output power from the generator, if the synchronizing period is unduly long. Further, when the quasi-online UPS system is initially turned on, an auxiliary induction motor called a "pony" motor is employed to rotate the synchronous motor/generator combination. Once the synchronous motor/generator pair has been brought up to approximately synchronous speed, a drive signal for the synchronous motor, derived from the MAINS multi-phase power signal, is provided, and the auxiliary motor is turned off.

SUMMARY OF THE INVENTION

This invention is based upon the inventor's critical observation that use of a variable speed drive including a three-phase inverter in combination with a motor/generator pair which includes a synchronous motor provides many unexpected benefits, when compared with the prior art described above. First, at system turn-on, the motor can be operated in its inductive mode to accelerate the motor/generator pair to near synchronous speed, and then switched to its synchronous mode of operation when near-synchronous speed is reached. This eliminates the requirement for the prior art auxiliary motor. Third, a DC power element in the variable speed drive which delivers the power signal converted by the inverter can be fed both by the MAINS multi-phase power signal and by the standby battery circuit. Thus, at switchover to standby when MAINS fails, the inverter is on, operating, and already in phase with the motor/generator pair. Resultantly, switchover occurs without delay and without attenuation of the motor drive signal provided by the inverter. Of course, use of a synchronous motor ensures that the motor/generator pair rotates at a synchronous speed which matches the ideal rotational speed necessary to ensure that the multi-phase output power signal is well within its rated performance, with the full margin allowed.

The invention is expressed as an uninterruptible power source for connection to an AC power MAINS, the power MAINS providing a multi-phase AC power signal. The UPS includes a standby source for providing a standby DC power signal, a power bus connected to the MAINS and to the standby source for providing a power bus signal in response to the multi-phase AC power signal, or in response to the standby DC power signal. A variable speed drive circuit provides a modulated drive signal in response to a multi-phase power signal. A multi-phase inverter is connected to the variable speed drive and to the power bus for providing a multi-phase motor drive signal in response to the modulated drive signal and to the power bus signal. The synchronous motor has a field winding and a startup winding, known as an amortisseur winding, the main winding being connected to receive the multi-phase motor drive signal, which induces rotation of the motor. A generator is coupled to the synchronous motor for rotation thereby, the generator producing a multi-phase output signal in response to rotation by the synchronous motor. A switch is connected to the MAINS, to the generator, and to the variable speed drive circuit, and is responsive to the condition of a first control signal for being set to a first state in which the multi-phase AC power signal is provided to the variable speed drive as the multi-phase power signal, and to a second state in which the multi-phase output signal is provided to the variable speed drive as the multi-phase power signal. Last, a controller is connected to the synchronous motor and to the switch for conditioning the first control signal in response to rotation of the synchronous motor.

Advantageously, the UPS controller conditions the control signal to place the switch in the second state in response to the motor's rotation substantially equalling a synchronous speed.

The controller also conditions the control signal to place the switch in the first state in response to the motor's rotation being less than a synchronous speed.

A principal objective of this invention is, therefor, to provide an UPS system utilizing a synchronous motor which is driven during the entire UPS operation through an online inverter.

A related goal is to provide an UPS system utilizing a synchronous motor/generator pair to produce a multi-phase output power signal when driven by a variable speed drive connected to the MAINS utility input and to a standby source.

Other goals, objectives, and distinct advantages of this invention will be appreciated when the following detailed description is read in conjunction with the below-described drawings.

It is therefore the primary object of the present invention to provide

BRIEF DESCRIPTION OF THE DRAWINGS

FIG. 4 is a combination block diagram and flow diagram illustrating details of operation of the UPS system of FIG. 1.

DESCRIPTION OF THE PREFERRED EMBODIMENTS

Figure 1:
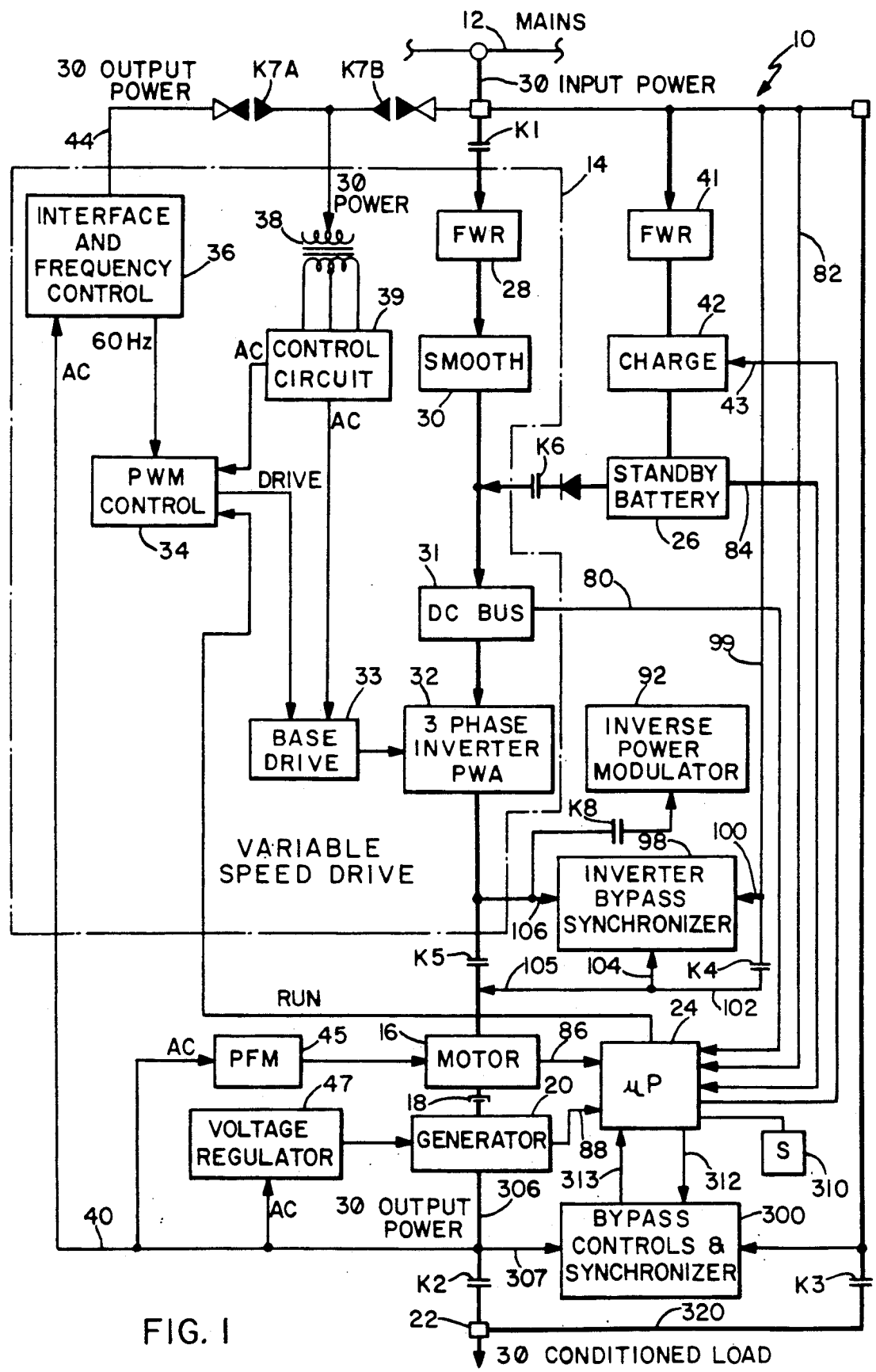
FIG. 1 is a block diagram of the novel UPS of the invention.

Refer to FIG. 1 for a complete representative illustration of a novel and unobvious uninterruptible power source (UPS) system, which embodies the below-claimed invention.

The UPS of this invention is indicated generally by reference numeral 10 in FIG. 1. The UPS 10 is fed a three-phase input power signal provided on a MAINS 12 from a utility power source (not shown). The UPS 10 includes a variable speed drive 14 connected to drive a motor/generator pair including a synchronous motor 16 connected by a coupling 18 to a synchronous generator 20. The variable speed drive provides a signal to rotate the motor 16, the rotation being mechanically coupled through a coupling 18 to turn the generator 20. Rotation of the generator 20 in response to rotation of the motor 16 generates a three-phase output power signal provided through an UPS output port 22. The UPS 10 has a microprocessor 24 conventionally programmed to execute an UPS control program to control startup, switchover, and other related functions of the UPS 10. The UPS 10 also includes a set of standby batteries 26 which provide DC power to the variable speed drive 14 upon failure of the three-phase input power signal from the MAINS 12.

With this complement of elements, the UPS 10 is enabled to provide the function required of any uninterruptible power source: the provision of a multi-phase output power signal from a rotating generator which is driven first by a signal derived from the input power signal, or from the standby source when the input power signal fails. This basic function ensures the uninterrupted provision of multi-phase power even in the face of failure of the primary source of multi-phase utility power.

In order to understand the invention, the structure of FIG. 1 is elaborated. The variable speed drive 14 includes first, a DC power circuit consisting of a full wave rectifier (FWR) 28 which feeds a smoothing capacitor circuit (SMOOTH) 30. The output of the circuit 30 is a rectified, smoothed DC power signal, which is fed to elements of the variable speed drive 14 through a conventional DC bus arrangement 31. The DC bus 31 outputs a highly stable DC power signal which is fed as one input to a speed drive control circuit including an inverter 32, a base drive circuit 33, a controller 34, and an interface and frequency control circuit 36. The inverter 32, which receives the D.C. power signals is a conventional three-phase inverter. The inverter also receives a frequency reference signal from the base drive circuit 33. In response to the frequency reference signal and to the DC power signal, the inverter circuit 32 operates conventionally to convert the DC power signal into a multi-phase, alternating-current (AC) signal which operates in this invention as the multi-phase motor drive signal provided to the motor 16. The base drive circuit is a conventional pulse-width modulating (PWM) circuit which operates in response to an AC power signal and a frequency reference signal (DRIVE). The DRIVE signal is obtained from the pulse width modulation control (PWM control) circuit 34, comprising a programmed micro-processor system which generates the DRIVE signal. In this regard, the DRIVE signal is a conventional digital waveform whose frequency is selectively variable by the PWM control 34. The PWM control 34 receives a 60 hertz reference signal from the interface and frequency control circuit 36. The 60 hertz reference signal is essentially a voltage level signal whose magnitude provides a reference to the PWM control 34. The PWM control 34 is conventionally designed and operated to convert a DC voltage signal to a frequency signal, the frequency signal being embodied in the DRIVE signal fed to the base drive 33. The 60 hertz reference is a signal derived by the frequency control 36 from the output of the generator 20. The three-phase output power signal is frequency-to-voltage converted by the frequency control circuit 36. The generator 20 is designed and intended to provide the three-phase output power signal at 60 hertz; consequently, when the generator 20 is operating at synchronous speed, conversion of its output power signal will provide a voltage reference for 60 hertz operation. The voltage reference is fed as the 60 hertz reference signal to the PWM control 36 to provide a reference for the DRIVE signal. When the generator 20 is operating at synchronous speed, the PWM control 34 adjusts the DRIVE signal to provide a 60 hertz signal to the base drive circuit 33. Since the 60 hertz is derived from the output of the generator 20, the base drive provides a pulse-width modulated (PWM) signal to the inverter that is in phase with, and therefor synchronous to, the operation of the generator. Since the generator is linked by way of the coupling 18 to rotate in synchronism with the motor 16, the PWM signal provided to the inverter 32 is in phase with, and therefor synchronous to, the rotation of the motor 16, thereby ensuring that the three-phase output of the inverter 32 is in synchronism with the motor 16.

Completing the description of the variable speed drive 14, power for the variable speed base drive circuit 33, 34, and 36 is obtained through a transformer 38 and a control and distribution circuit 39. The control and distribution circuit 39 provides an AC power signal to the PWM control 34 and to the base drive 33, which is converted in those elements by on-board power conversion circuitry to the DC power necessary to operate these circuit elements.

The final features of the variable speed drive 14 which are of interest to this invention include the provision of a RUN signal from the micro-processor 24 on signal line 24a to the PWM control circuit 34 and pass through the AC output power signal produced by the generator 20. The DRIVE signal initiates operation of the control circuit 34 when activated by the microprocessor 24. The multiphase output signal produced by the generator 20 is conducted on signal line 40 to the interface and frequency control circuit 36. The circuit 36 uses a portion of the signal to derive the 60 hertz reference signal. The remainder is passed through the circuit to signal line 41.

The standby battery circuit 26 in the UPS 10 is charged from the utility input from the MAINS 12 by way of a full wave rectifier 41 and a charge circuit 42, which together operate conventionally to charge the batteries in the standby battery circuit 26. Operation of the charging circuit 42 is initiated in response to a START signal received on signal line 43 from the micro-processor 24.

The motor/generator pair 16/20 has auxiliary control provided through, respectively, a power factor module (PFM) 45 and voltage regulator 47. Both the PFM 45 and voltage regulator 47 receive the multi-phase AC signal derived from the output of the generator 20 and provided on signal line 40. This signal is used conventionally by the voltage regulator 47 to establish the magnitude of the voltage output by the generator 20. The PFM 45 uses the AC signal derived from the generator 20 to provide an excitation voltage to the field windings of the motor 20. When the motor is operating synchronously, the PFM 45 operates conventionally to provide the excitation voltage at the level necessary to maintain rotation of the motor 16 at its synchronous speed.

Figure 3:
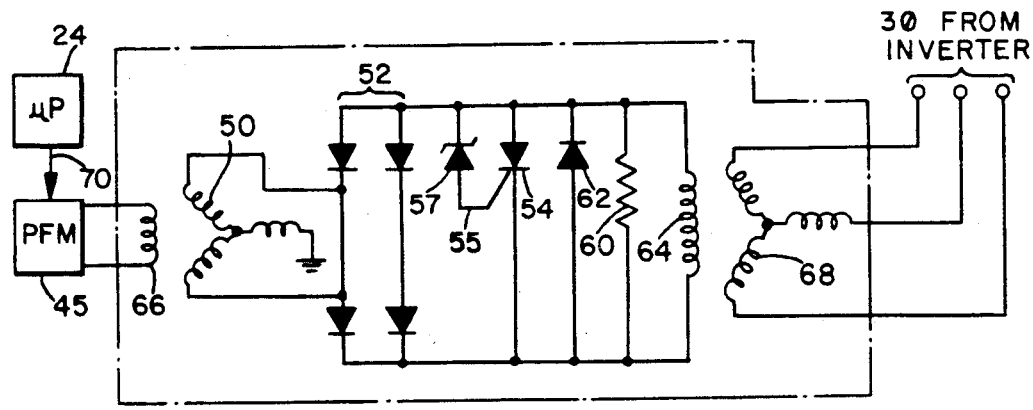
FIG. 3 illustrates the detail of the rotating section of a synchronous motor in the UPS of FIG. 1.

The motor 16 is a synchronous motor whose essential schematic is illustrated in FIG. 3. Since it is a synchronous motor, the motor 16 has bi-modal operation, operating in one mode as an induction motor, and in the second mode as a synchronous motor. The rotating portion of the motor 16 includes excitor armature windings 50, a diode circuit 52, a silicon controlled rectifier 54, whose gate lead 55 is connected to the diode array 52 though a zener diode 57. The rotating portion of the motor 20 further includes, in parallel, a resistor 60, a diode 62, and motor field windings and poles 64. The stationary elements of the motor 20 include excitor field windings and poles 66 and stator windings 68. Initially, a three-phase motor drive signal is applied to the stator windings and core 68, which, through the field winding 64, accelerates the rotating elements of the motor 16. The field induced in the field windings 64 turns on the silicon control rectifier 54, which effectively short circuits the diode circuit 52. This prevents generation of a field in the windings 50 by the EMF in the windings 6B. The diode circuit 52 is kept short-circuited for so long as the SCR 54 conducts. In the invention, when the motor 16 has accelerated to near synchronous speed, the microprocessor 24 provides an activation signal to the PFM 45 on signal line 70. This signal causes the PFM 45 to operate conventionally by driving a current through the excitor field windings 66, which induces an EMF in the excitor armature windings 50. The EMF in the windings 50 turns on the diode circuit 52, and through the circuit 52, the zener diode 57 is turned off, which deactivates the SCR 54.

Therefore, as the motor 16 starts and accelerates, its rotation is ramped from zero RPM to near synchronous speed by the EMF in the windings 68. The field windings 64 develop a counter EMF having a frequency determined by the frequency of the multi-phase motor drive signal provided by the inverter 32. As the rotational speed of the motor 16 increases, this induced voltage gradually decreases and approaches zero as rotation approaches synchronous speed. Until this time, the field winding 64 is short circuited by the activated SCR 54. When synchronous speed is reached, and the PFM 45 is switched on, the SCR is turned off, and rotation is maintained by the exciting field. Conventionally, with the motor now operating in its synchronous mode, its synchronizing torque will phase-lock the motor into synchrony with the multi-phase motor drive signal provided by the inverter 32. Adjustment of the operation of the PFM 45 can create power factor correction. The PFM 45 is normally set so that the synchronous motor operates a unity power factor under a full load condition. This condition actually lowers the current drawn by the motor 16 from the inverter 32 and increases the overall efficiency of the UPS 10.

Figure 2:
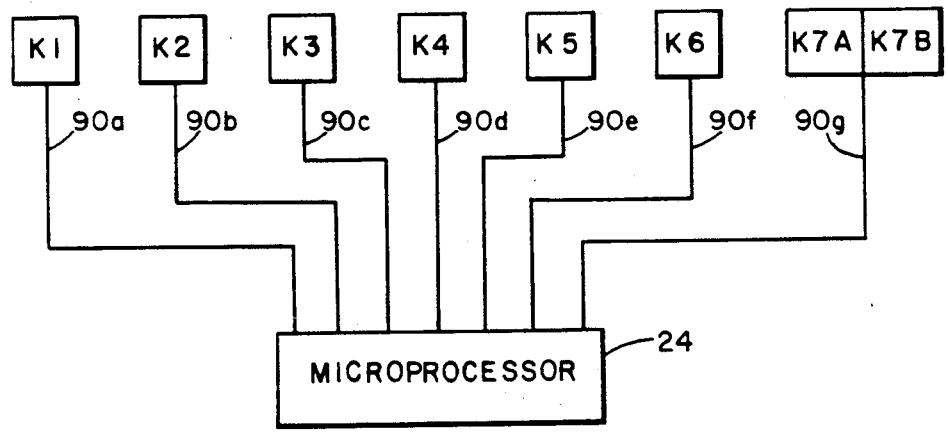
FIG. 2 illustrates a microprocessor interconnection with a set of switches in the UPS of FIG. 1.
Figure 1:
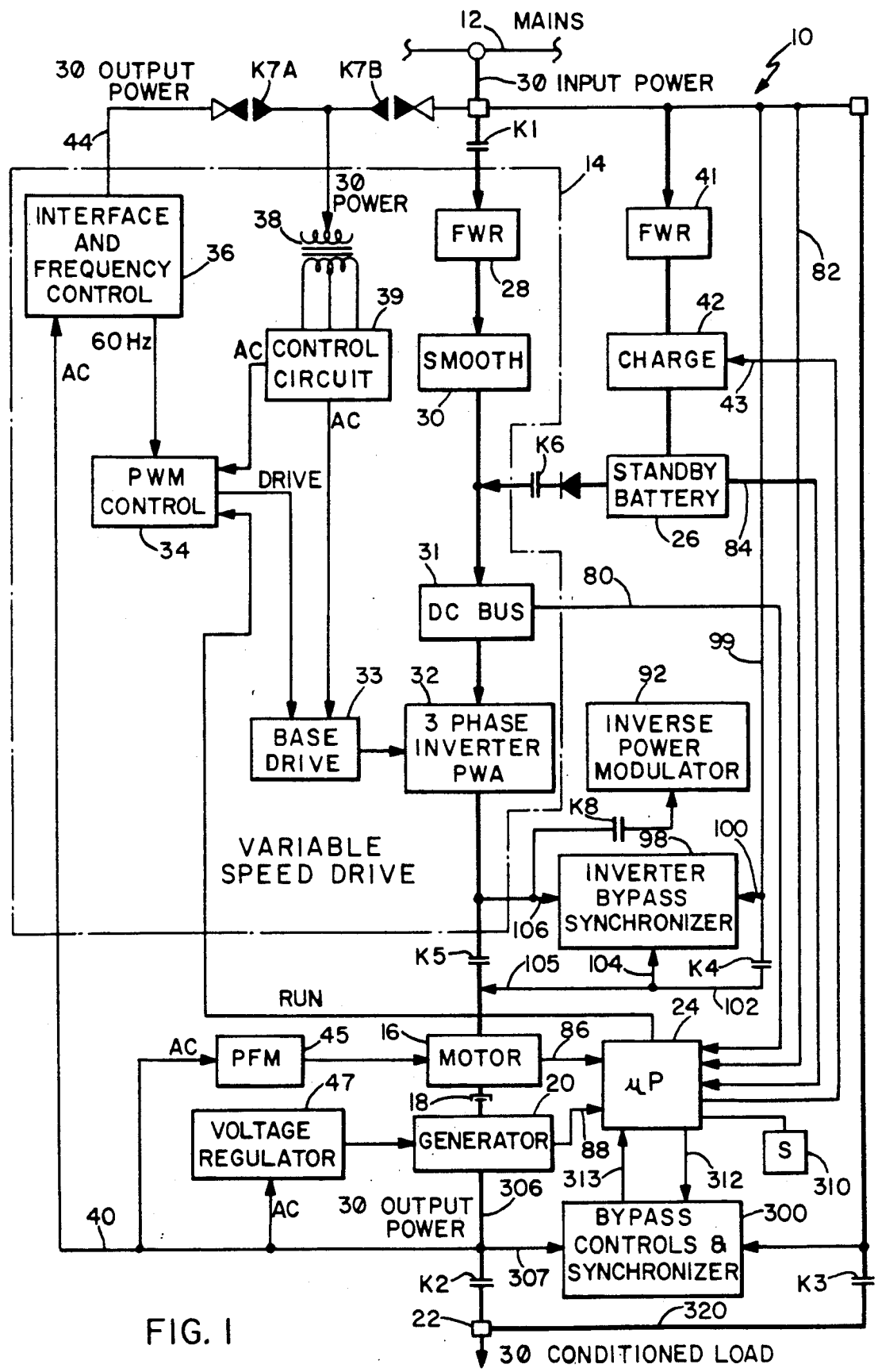

Understanding of the operation of the UPS 10 will be complete when the connections of the micro-processor 24 are understood with reference to FIGS. 1 and 2. The micro-processor 24 receives on signal line 80 a signal from the DC bus 31 which indicates the level of DC power provided by the bus circuit 31. On signal line 82, a portion of the utility input derived from the MAINS 12 is conducted to the micro-processor 24. On signal line 84, the charge level of the standby battery circuit 26 is given. A signal proportional to the speed of the motor 16 is provided to the micro-processor 24 on signal line 86. A signal indicative of the voltage level and frequency of the output power signal produced by rotation of the generator 20 is conducted to the micro-processor 24 on signal line 88. Last, switch contacts K1, K2, K3, K4, K5, K6, and the double-pole switch contacts K7A and K7B, are all individually set by respective signals from micro-processor 24 provided on signal lines 90a-90g.

OPERATION OF THE PREFERRED EMBODIMENT

Drawing together now the representations of the invention given in FIGS. 1-3, the operation of the UPS 10 will now be explained in detail.

Initially, all of the contacts K1-K6 are open. Contacts K7A are closed and contacts K7B are open. Presuming availability and correct operation of the three-phase input power from the MAINS 12 and DC power from standby battery circuit 26, the automatic start/run sequence of the UPS 10 begins with detection of availability of the three-phase input power by the micro-processor 24 on signal line 82, following which the micro-processor 24 closes the contacts of the switch K1 by a provision of a signal on signal line 90a, allowing three-phase MAINS power to pass to the variable speed drive 14. At this time, the processor 24 provides a signal on signal line 90e to close the contacts of switch K5, which connects the output of three-phase inverter 32 to the synchronous motor 16. Last, the micro-processor 24 configures the double throw switch K7A and K7B to open the contacts K7A, and close the contacts K7B, thereby providing utility power to the transformer 38 to power the PWM controller 34 and base drive circuit 33. Closure of the K1 contacts provides three-phase power to the full wave rectifier 28. In a commercially available variable speed drive, the control circuit 39 after the initial receipt of power through the transformer 38 controls the smoothing circuit 30 to undergo a 15 second "walk in" condition, which builds up the charge on the smoothing capacitors in the circuit 30 before closure of a contact (not shown) in the variable speed drive 14 which passes full DC rectified power to the DC bus circuit 31.

After DC power is provided to the bus circuit 31, the control circuit 39 provides the AC waveforms to the base drive 33 and PWM control circuit 34. Upon initial receipt of the AC signal from the control circuit 39 and, assuming activation of the RUN signal by the micro-processor 24, the PWM control circuit 34 provides a DRIVE signal to the base drive 33 which ramps up in frequency, which in turn operates the inverter 32 to continuously increase the frequency of the multi-phase multi-drive signal to the motor 16. Since the PFM 45 is not activated at this point, the motor 16 operates in its inductive mode and begins to rotate with an increasing frequency in response to the increasing frequency of the motor drive signal provided by the phase inverter 32. As explained above, when the motor 16 initially receives the motor drive signal from the inverter, the SCR 54 turns on, which shorts out the main field of the motor, causing it to operate in its induction mode.

As the rotation of the motor 16 accelerates from zero RPM toward near synchronous speed, the coupling 18 couples the rotation to the generator 20, thereby powering the generator field to ramp up the frequency and magnitude of the three-phase output power signal produced by the generator 20. As the output power signal increases, the reference signal provided by the frequency control circuit to the PWM control circuit 34 increases toward the voltage level corresponding to a frequency of 60 hertz.

As the motor and generator 16 and 20 accelerate, their rotational speeds and the magnitude of the power output by the generator are provided to the micro-processor 24 on signal lines 86 and 88. When these signals indicate that the motor and generator have achieved near-synchronous speed, the micro-processor on signal line 70 switches on the PFM 45, which deactivates the SCR in the motor field and allows the synchronous motor 16 to phase lock with the multi-phase motor drive signal output by the inverter 32. At the same time, the microprocessor 24 changes the contact configuration of the joint switch K7A and K7B to close the K7A contacts and open the K7B contacts. This disconnects the utility power signal provided by the MAINS 12 from the transformer 38 and substitutes the three-phase output power signal generated by the generator 20 and passed through the frequency control circuit 36 to the transformer by way of the closed K7B contacts. This action causes the speed drive control circuitry 32, 33, 34, and 36 to disconnect from the utility power source and connect to the three-phase output power produced by synchronous generator 20. Although not illustrated, it is asserted that the capacitance of the speed drive control circuits provides the inertia necessary to damp the effect of changeover from MAINS to generator power effectively to zero.

With the motor 16 now operating synchronously and phase-locked with the output of the inverter 32, the synchrnonous generator produces a three-phase output power signal whose voltage and frequency are within required limits. Now, the micro-processor 24 closes the contact K2 via signal line 90b, which, in turn, applies the synchronous generator output to the output node 22.

Assuming now that the micro-processor detects adequate standby power in the battery circuit 26 (on signal line 84), the K6 contacts are closed by the micro-processor 24 on signal line 90f, thereby connecting the standby battery circuit to the input of the DC bus circuit 31. Now, the processor 24 activates the charge circuit 42 via signal line 43 and battery charging takes place from the MAINS utility input.

The UPS 10 is now running and on line.

Assume now that there is a loss of MAINS power input, resulting in removal of the three-phase input power signal from the full wave rectifier 28 in the variable speed drive. Loss of this signal is sensed on signal line 82 by the processor 24. In response to loss of the main AC input signal, the processor 24 opens the K1 contacts. The operation of the synchronous motor 16 continues under power of the standby batteries through the DC bus circuit 31. The speed drive controls 32, 33, 34, and 36 in the variable speed drive 14 are powered by the output of the synchronous generator 20. Thus, switchover is accomplished without having to switch on the inverter 32, and without having to synchronize the motor 16 with the operation of the inverter 32.

If utility power does not return within a predetermined amount of time equal to the duration of the standby battery power, then the processor 24 will shut the system down by opening contacts K1, K7A, K2, K5, and K6.

If utility power returns prior to standby battery power depletion, then the processor 24 closes the contacts K1, allowing utility power to once more drive the system through the variable speed driver 14. The standby batteries automatically go into a charge mode in preparation for the next utility power failure.

Preferably, the micro-processor 24 is powered initially from the utility power source 12, but after the UPS 10 is running at synchronous speed, the power source is switched from the MAINS 12 to the synchronous generator 20. This is not illustrated, but is well within the ability of the skilled artisan to implement.

ANCILLARY FUNCTIONS AND OPERATIONS

Assuming normal operation and full loading of the UPS 10 through the output connector 22, it is assumed that the load is suddenly removed from the connector 22. As is known, upon shedding a full load, a reverse power condition will be evidenced by the motor 16, resulting in transfer of an EMF back to the inverter 32. Failure to eliminate this reverse power condition can damage the speed drive ciruitry 32, 33, 34 and 36 to shut down, or can result in an over-voltage condition measured at the DC bus circuit 31. Normally, detection of reverse power loading or over-voltage on the DC bus would shut the variable speed drive 14 down via internal controls which are not shown. The micro-processor 24 senses this condition on the signal line 86 and, to alleviate its effects, closes the contacts of switch K8, which delivers the reverse-loaded power to an inverse power modulator 92. The inverse power modulator 92 operates to receive and expend the reverse-loaded power, thereby removing it from the output ports of the inverter 32, and preventing shut-down of the variable speed drive 14.

Next are described automatic by-pass of the UPS 10 and by-pass of the inverter 32. For these functions, an inverter by-pass and frequency synchronization circuit 98 is provided. The circuit 98 has three inputs at 100, 104 and 106. The input 100 is connected to the input utility power by signal line 99, which also connects to one side of the contacts K4. The opposing side of the contacts K4 are attached to signal line 102, which feeds the input branch 104 and which also has connection to the input of the motor 16 through signal line 105. The signal line 105 connects between K5 in the motor 16. Last, the signal line 106 connects between the inverter 32 and the upper sid of K5, feeding to K8 and providing the third input to the inverter by-pass and frequency synchronization circuit 98.

Refer now to FIG. 4. In FIG. 4, the inverter by-pass in frequency synchronizer circuit 98 is represented schematically by manual switches 200 and 202, by electronically operated switches 204, 206, 208, 210, and 212, and by a conventional frequency synchronizer 214. In FIGS. 1 and 4, identical numerals indicate the same signal leads for the inputs to the inverter by-pass and frequency synchronizer circuit 98. In addition, control signals are provided to the micro-processor 24 from representative switches 200, 202, 204, and 206, while the micro-processor provides control signals to switches 208, 210, and 212.

Assume first that during normal operation of the UPS 10 it may be required to transfer the motor drive signal source from the inverter 32 to the three phase input power from the utility MAINS 12. This procedure is signaled to the micro-processor 24 by a signal produced by the switch 202, which is sensed by the micro-processor 24, with the result that the micro-processor closes the switches 210 and 212. Closure of the switches 210 and 212 provides to the synchronizer 214, the output of the inverter on signal line 106 and the three phase input power on signal path 99. When the synchronizer detects a zero phase difference between these two signals, it provides a signal opening the switch 204 and closing the switch 206. The micro-processor 24 responds to this configuration of the switches 204 and 206 by providing a signal to close the utility contactor K4 and open the inverter contactor K5. Since the switch-over occurs when the output of the inverter and the three phase input power are in phase, no interruption is evident in the synchronous operation of the motor 16. Consequently, no effect is evident in the frequency, phase, or magnitude of the three phase output power produced by the generator 20.

Now, assume that the drive signal to the motor 16 is to be switched from the MAINS 12 back to the output of the inverter 32. Now, the switch 202 is closed and the switch 200 is opened. In response, the micro-processor 24 closes the switch 212, and opens the switch 210, thereby providing the output of the inverter and the utility input to the synchronizer 214. When the synchronizer detects zero phase difference between the signals, it opens the switch 206 and closes the switch 204, causing the micro-processor 24 to open the contactor K4 and close the contactor K5. Again, this switch-over occurs when the AC MAINS and the output of the inverter 32 are in synchronism, thereby preventing any effect on the rotation of the motor 16 and the three phase output power produced by the generator 20.

Last, refer now to FIG. 1 where a by-pass control and synchronizer circuit 300 is connected to the MAINS power by signal path 301, 302 and to the output of the generator by signal path 306, 307. When manual switch 310 is closed, the micro-processor 24 signals the circuit 300 to synchronize the AC signals on signal lines 302 and 307. When synchronization is detected, the circuit 303 provides a signal on signal line 313 to the micro-processor 24. In response to the signal, the micro-processor 24 will close the contact K3 and open the contact K2. This disconnects the entire UPS 10 from the load, while providing as the output signal, the input power signal derived from the MAINS by signal path 301, K3, 320, 22. This permits the UPS 10 to be repaired, maintained, or replaced. When the UPS 10 is to be once again operated to provide the three phase conditioned load signal through the connector 22, the UPS 10 is powered up, the motor/generator pair 16, 20 is brought to synchronous speed, and the switch 310 is opened. When the switch 310 is opened, the micro-processor 24 provides a synchronization request signal on the signal line 312, in response to which the circuit 300 watches the phases of the output of the generator 20 and the MAINS power signal. When synchronization is detected, a synchronization signal is passed back on signal line 313 to the micro-processor 24 in response to which, the micro-processor opens the contact K3 and closes the contact K2, resulting in switch-over of three phase condition load power without interruption of phase, frequency, or magnitude of the output power signal.

Although the prior art provides an abundance of examples and availability of many of the individual elements described above, it does not provide them in precisely the operative interconnection illustrated in FIGS. 1–4. Variable speed drives corresponding to that described are obtainable by modification of equipments available from the Yaskawa Electric Manufacturing Company, Ltd., having offices in Tokyo, Japan and Los Angeles, Calif., USA. An exemplary Yaskawa variable speed drive is the VS-616HII. Synchronous motors and generators of the kind described above are available, for example, from Kato Engineering, Mankato, Minn. Such a motor is described in, for example, Kato Engineering Publication No. 350-02005-00, July, 1977. The motor 16 illustrated in FIGS. 1 and 3 hereinabove, can be obtained through conversion of a synchronous motor of the kind supplied by Kato Engineering modified with the SCR in zener diode configuration illustrated in FIG. 3.

While I have described a preferred embodiment of my uninterruptible power source, it should be understood that modifications and adapations thereof will occur to persons skilled in the art. Therefore, the protection afforded my invention should only be limited in accordance with the scope of the following claims.

I claim:

1. An uninterruptible power source for connection to an AC power mains, said power mains providing a multi-phase AC power signal, said uninterruptible power source comprising:

a standby source for providing a standby power signal;

power bus means connected to said AC power mains and to said standby source for providing a power bus signal in response to said multi-phase AC power signal or in response to said standby power signal;

a variable speed drive circuit which provides a modulated drive signal in response to a multi-phase power signal;

a multi-phase inverter connected to said variable speed drive circuit and to said power bus means for providing a multi-phase motor drive signal in response to said modulated drive signal and said power bus signal;

a synchronous motor with a startup winding connected to receive said multi-phase motor drive signal, and a field winding;

a generator coupled to said synchronous motor for rotation by said synchronous motor, said generator producing a multi-phase output signal in response to rotation by said synchronous motor;

a load connection connected to said generator for coupling said multi-phase output signal to a load;

a switch connected to said mains, said generator, and said variable speed drive, said switch responsive to the condition of a first control signal for being set to a first state in which said multi-phase AC power signal is provided to said variable speed drive as said multi-phase power signal, and to a second state in which said multi-phase output signal is provided to said variable speed drive as said multi-phase power signal; and control means connected to said synchronous motor and to said switch for conditioning said first control signal in response to rotation of said synchronous motor.

2. The uninterruptible power source of claim 1, wherein said control means conditions said control signal to place said switch in said second state in response to said rotation substantially equalling a synchronous speed.

3. The uninterruptible power source of claim 1, wherein said control means conditions said control signal to place said switch in said first state in response to said rotation being less than a synchronous speed.

4. The uninterruptible power source of claim 1, further including a field winding excitation circuit connected to said field winding and to said control means for providing a field winding excitation signal in response to a second control signal, said control means producing said second control signal in response to rotation of said synchronous motor.

5. The uninterruptible power source of claim 4, wherein said control means produces said second control signal in response to said rotation substantially equalling a synchronous speed.

6. The uninterruptible power source of claim 4 wherein said field winding excitation circuit includes a connection to said generator for converting said multi-phase output signal into said field winding excitation signal.

7. The uninterruptible power source of claim 1 wherein said control means produces a second control signal conditioned to a by-pass state and said uninterruptible power source includes a by-pass means connected to said synchronous motor, to said control means, and to said mains for substituting said multi-phase AC power signal for said multi-phase motor drive signal at said start-up winding in response to said second control signal and to synchronization between said multi-phase AC power signal and said multi-phase motor drive signal.

8. The uninterruptible power source of claim 1 wherein said control means produces a second control signal conditioned to an over voltage state in response to reverse loading of said synchronous motor and said uninterruptible power source includes a power absorption means connected to said synchronous motor and to said control means for switchably connecting to said synchronous motor to attenuate said reverse loading in response to said second control signal.

9. The uninterruptible power source of claim 1 wherein said control means produces a second control signal conditioned to indicate output power switching and said uninterruptible power source includes an output by-pass means connected to said control means, to said generator, to said load connection and to said mains for substituting said multi-phase input signal for said multi-phase output signal at said load connection in response to said second control signal.

10. An uninterruptible power source for connection to an AC power utility which generates a multi-phase utility power signal, comprising:

a source of standby DC power;

a variable speed drive connected to said AC power utility and to said source of standby DC power for providing a multi-phase drive signal in response to said utility power signal or to said standby DC power;

a speed drive circuit in said variable speed drive which controls the frequency of said multi-phase drive signal in response to an input power signal and a speed indication signal;

a synchronous motor/generator assembly connected to said variable speed drive for producing a multi-phase output power signal in response to said multi-phase drive signal, said multi-phase output power signal having frequency characteristics determined by rotation of said synchronous motor/generator assembly, said rotation of said synchronous motor/generator assembly being at a speed corresponding to said frequency characteristics;

means connected to said speed drive circuit and to said synchronous motor/generator assembly for providing said multi-phase output power signal to said speed drive circuit as said speed indication signal; and a switching means connected to said synchronous motor/generator assembly, to said speed drive circuit, and to said power utility for providing said input power signal from said power utility in response to said synchronous motor/generator rotating at less than a synchronous speed and from said motor/generator in response to said motor/generator rotating substantially at said synchronous speed.

11. The uninterruptible power source of claim 10, wherein said synchronous motor/generator assembly includes:

a synchronous motor with a startup winding connected to said variable speed drive for receiving said multi-phase drive signal, and a field winding, said synchronous motor rotating in response to said multi-phase drive signal;

a power factor circuit connected to said field winding for providing a field excitation signal in response to said synchronous motor rotating substantially at a synchronous speed; and said synchronous motor rotating in a synchronous mode in response to said field excitation signal.

12. An interruptible power source for connection to an AC power mains, said power mains providing a multi-phase AC power signal, said uninterruptible power source comprising:

a standby source for providing a standby DC power signal;

power bus means connected to said AC power mains and to said standby source for providing a power bus signal in response to said multi-phase AC power signal or in response to said standby DC power signal;

a variable speed drive which provides a modulated drive signal in response to a multi-phase power signal;

a multi-phase inverter in said variable speed drive circuit and connected to said power bus means for providing a multi-phase motor drive signal in response to said modulated drive signal and said power bus signal;

a motor connected to said multi-phase inverter for rotating in response to said multi-phase motor drive signal;

a generator coupled to said motor for rotation by said motor, said generator producing a multi-phase output signal in response to rotation of said motor;

a load connection connected to said generator for coupling said multi-phase output signal to a load; and a switching means connected to said AC power mains, said motor, said generator, and said variable speed drive for providing said multi-phase AC power signal to said variable speed drive as said multi-phase power signal in response to said motor accelerating to a predetermined speed and for providing said multi-phase output signal as said multi-phase power signal in response to said motor rotating substantially at said predetermined speed.

13. The uninterruptible power source of claim 12, wherein said switching means includes:

a switch connected to said AC power mains, said generator, and said variable speed drive, said switch responsive to the condition of a control signal for being set to a first state in which said multi-phase AC power signal is provided to said variable speed drive as said multi-phase power signal, and to a second state in which said multi-phase output signal is provided to said variable speed drive as said multi-phase power signal; and control means connected to said motor and to said switch for conditioning said control signal in response to rotation of said motor.

* * * * *